United States Patent
Shank et al.

(10) Patent No.: US 10,466,514 B1
(45) Date of Patent: Nov. 5, 2019

(54) ELECTRO-OPTIC MODULATOR WITH VERTICALLY-ARRANGED OPTICAL PATHS

(71) Applicant: GLOBALFOUNDRIES Inc., Grand Cayman (KY)

(72) Inventors: Steven M. Shank, Jericho, VT (US); Siva P. Adusumilli, South Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/181,879

(22) Filed: Nov. 6, 2018

(51) Int. Cl.
| | |
|---|---|
| *G02F 1/035* | (2006.01) |
| *G02F 1/225* | (2006.01) |
| *G02B 6/122* | (2006.01) |
| *G02B 6/136* | (2006.01) |
| *F21V 8/00* | (2006.01) |
| *G02F 1/015* | (2006.01) |
| *G02F 1/21* | (2006.01) |
| *G02B 6/12* | (2006.01) |

(52) U.S. Cl.
CPC ........... *G02F 1/035* (2013.01); *G02B 6/0076* (2013.01); *G02B 6/122* (2013.01); *G02B 6/136* (2013.01); *G02F 1/225* (2013.01); *G02F 1/2257* (2013.01); *G02B 2006/12061* (2013.01); *G02B 2006/12176* (2013.01); *G02F 2001/0151* (2013.01); *G02F 2001/0152* (2013.01); *G02F 2001/0153* (2013.01); *G02F 2001/0154* (2013.01); *G02F 2001/212* (2013.01)

(58) Field of Classification Search
CPC ...... G02B 6/122; G02B 6/136; G02B 6/0076; G02B 2006/12061; G02B 2006/12176; G02F 1/01; G02F 1/035; G02F 1/225; G02F 1/2257; G02F 2001/0151–0154; G02F 2001/0156; G02F 2001/212
USPC ................................... 385/2, 3, 14, 129–132
See application file for complete search history.

(56) References Cited

U.S. PATENT DOCUMENTS

| | | |
|---|---|---|
| 6,819,853 B2 | 11/2004 | Lam et al. |
| 7,646,957 B2 | 1/2010 | Blauvelt et al. |

(Continued)

OTHER PUBLICATIONS

Bessette et al., "Vertically stacked microring waveguides for coupling between multiple photonic planes", Optical Society of America, Jun. 3, 2013, vol. 21, No. 11.

(Continued)

*Primary Examiner* — Robert Tavlykaev
(74) *Attorney, Agent, or Firm* — Thompson Hine LLP

(57) ABSTRACT

Structures for an electro-optic modulator and methods of fabricating such structures. A first plurality of cavities are formed in a bulk semiconductor substrate. A passive waveguide arm includes a first core arranged over the first plurality of cavities. The passive waveguide arm has an input port and an output port that is spaced lengthwise from the input port. An epitaxial semiconductor layer is arranged over the bulk semiconductor substrate, and includes a second plurality of cavities. An active waveguide arm includes a second core that is arranged over the second plurality of cavities. The second core of the active waveguide arm is coupled with the input port of the first core of the passive waveguide arm, and the second core of the active waveguide arm is also coupled with the output port of the first core of the passive waveguide arm.

20 Claims, 19 Drawing Sheets

(56) References Cited

U.S. PATENT DOCUMENTS

| | | | | |
|---|---|---|---|---|
| 7,920,770 | B2* | 4/2011 | Holzwarth | B82Y 20/00 385/129 |
| 8,437,585 | B2* | 5/2013 | Na | G02B 6/12002 216/24 |
| 9,385,022 | B2* | 7/2016 | Jaffe | H01L 21/76224 |
| 9,568,674 | B2* | 2/2017 | Sandhu | G02B 6/136 |
| 9,606,291 | B2 | 3/2017 | Ellis-Monaghan et al. | |
| 2005/0029619 | A1* | 2/2005 | Forbes | H01L 21/26506 257/516 |
| 2007/0253663 | A1* | 11/2007 | Keyser | G02B 6/12 385/36 |
| 2007/0281493 | A1* | 12/2007 | Fucsko | H01L 21/30608 438/739 |
| 2008/0317423 | A1* | 12/2008 | Stepanov | G02B 6/122 385/132 |

OTHER PUBLICATIONS

Steven M. Shank et al., "Waveguides With Multiple-Level Airgaps", U.S. Appl. No. 15/905,165, filed Feb. 26, 2018.

* cited by examiner

US 10,466,514 B1

ELECTRO-OPTIC MODULATOR WITH VERTICALLY-ARRANGED OPTICAL PATHS

BACKGROUND

The present invention relates to photonics chips and, more specifically, to structures for an electro-optic modulator and methods of fabricating such structures.

Photonics chips integrate optical components and electronic components into a single chip. Photonics chips are capable of being used in many applications and many systems including, but not limited to, data communication systems and data computation systems. The electronic components may include, for example, field-effect transistors, and the optical components may include waveguides. Layout area, cost, and operational overhead may be reduced by including both types of components on a single photonics chip.

On-chip communication and sensing may rely on transferring electromagnetic radiation through silicon waveguides in the mid-infrared wavelength range of 3 microns (µm) to 8 µm. Silicon waveguides may be fabricated from the single-crystal silicon contained in the device layer of a semiconductor-on-insulator (SOI) wafers. The buried insulator layer of the SOI wafer, which is typically composed of silicon dioxide, provides cladding for the silicon waveguides. Silicon waveguides may experience signal loss because the silicon dioxide of the buried insulator layer strongly absorbs electromagnetic radiation starting at a wavelength of 3.5 µm in the mid-infrared wavelength range.

Improved structures for an electro-optic coupler, as well as methods of fabricating such structures, are needed.

SUMMARY

In an embodiment of the invention, a structure is provided for an electro-optic modulator. The structure includes a first plurality of cavities in a bulk semiconductor substrate. A passive waveguide arm includes a first core that is arranged over the first plurality of cavities. The passive waveguide arm has an input port and an output port that is spaced lengthwise from the input port. An epitaxial semiconductor layer is arranged over the bulk semiconductor substrate and includes a second plurality of cavities. An active waveguide arm includes a second core arranged over the second plurality of cavities. The second core of the active waveguide arm is coupled with the input port of the first core of the passive waveguide arm, and the second core of the active waveguide arm is also coupled with the output port of the first core of the passive waveguide arm.

In an embodiment of the invention, a method is provided of forming an electro-optic modulator. The method includes forming a first plurality of cavities in a bulk semiconductor substrate, forming a first core of a passive waveguide arm over the first plurality of cavities, forming a epitaxial semiconductor layer arranged over the bulk semiconductor substrate, forming a second plurality of cavities in the epitaxial semiconductor layer, and forming a second core of an active waveguide arm over the second plurality of cavities. The passive waveguide arm includes an output port that is spaced lengthwise from an input port. The input port couples the second core of the active waveguide arm with the first core of the passive waveguide arm, and the output port couples the second core of the active waveguide arm with the first core of the passive waveguide arm.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals are used to indicate like features in the various views.

DETAILED DESCRIPTION

Figure 1:
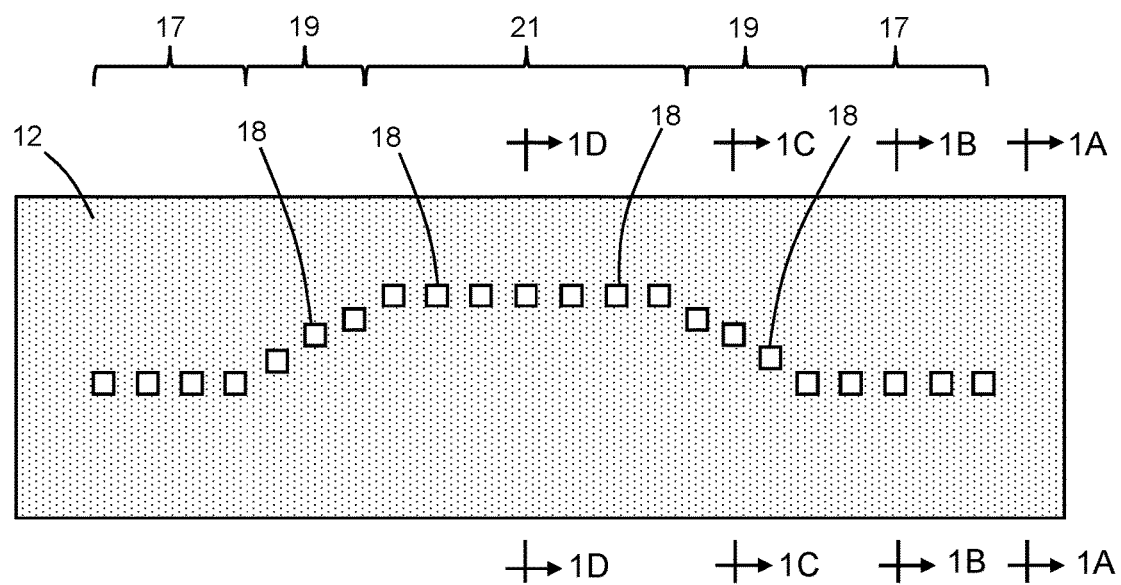
FIG. 1 is a top view of a structure at an initial fabrication stage of a processing method in accordance with embodiments of the invention.
Figure 1A:
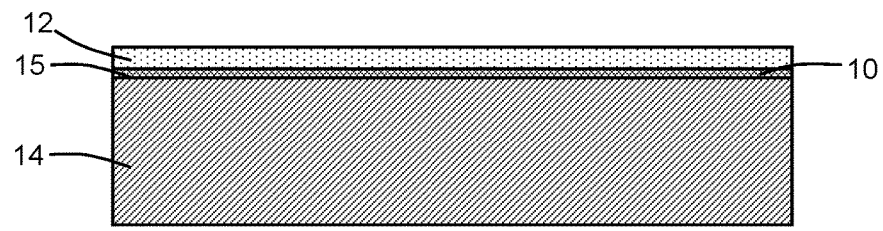
FIG. 1A is a cross-sectional view taken generally along line 1A-1A in FIG. 1.
Figure 1B:
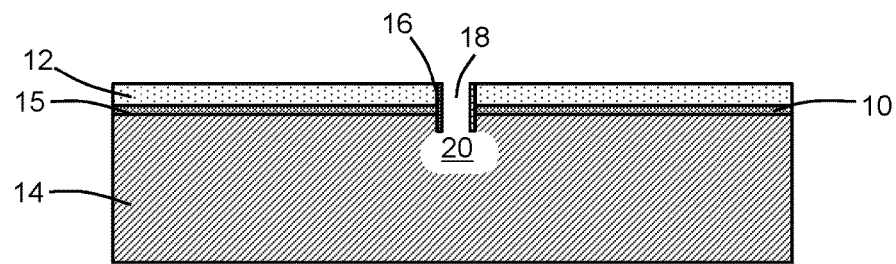
FIG. 1B is a cross-sectional view taken generally along line 1B-1B in FIG. 1.
Figure 1C:
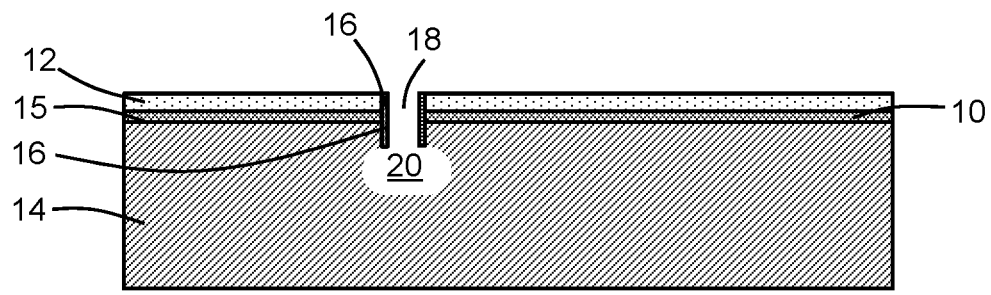
FIG. 1C is a cross-sectional view taken generally along line 1C-1C in FIG. 1.
Figure 1D:
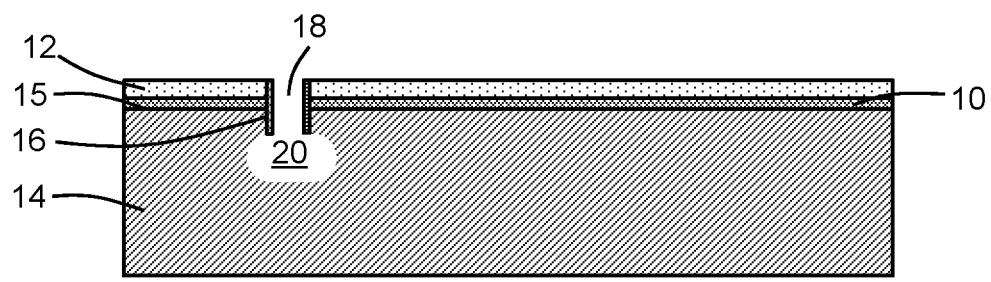
FIG. 1D is a cross-sectional view taken generally along line 1D-1D in FIG. 1.
Figure 2A:
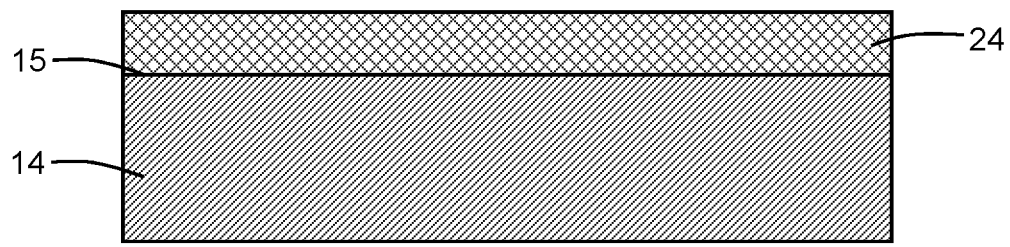
FIGS. 2A-2D are cross-sectional views of the structure at a fabrication stage subsequent to FIGS. 1A-1D.
Figure 2B:
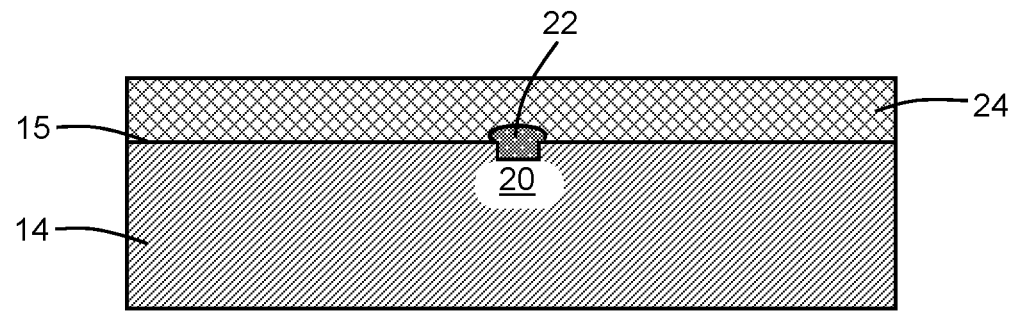
Figure 2C:
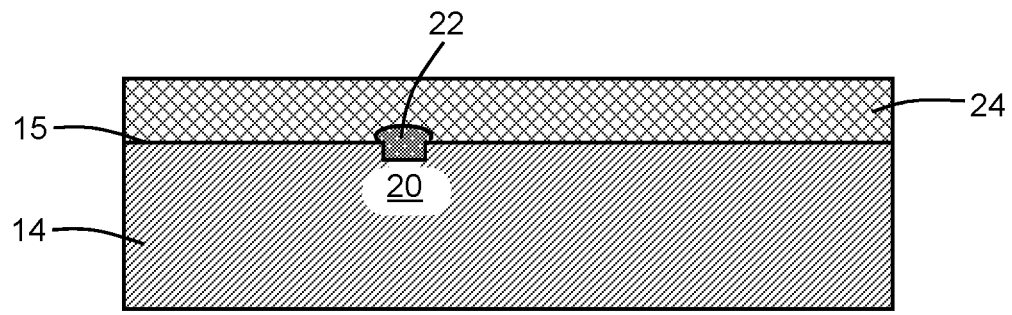
Figure 2D:
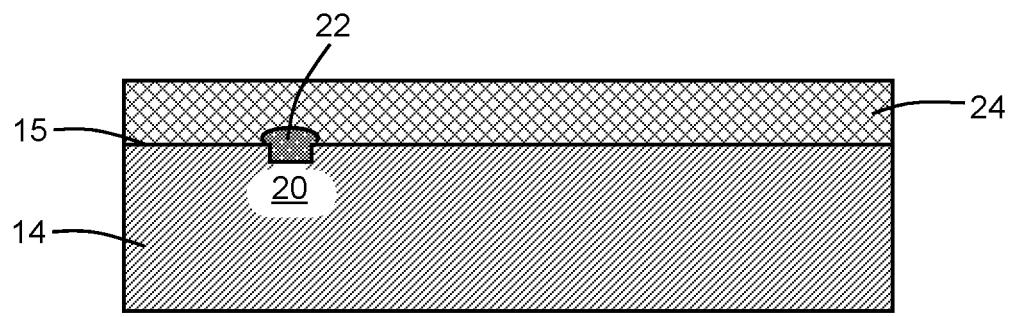
Figure 3:
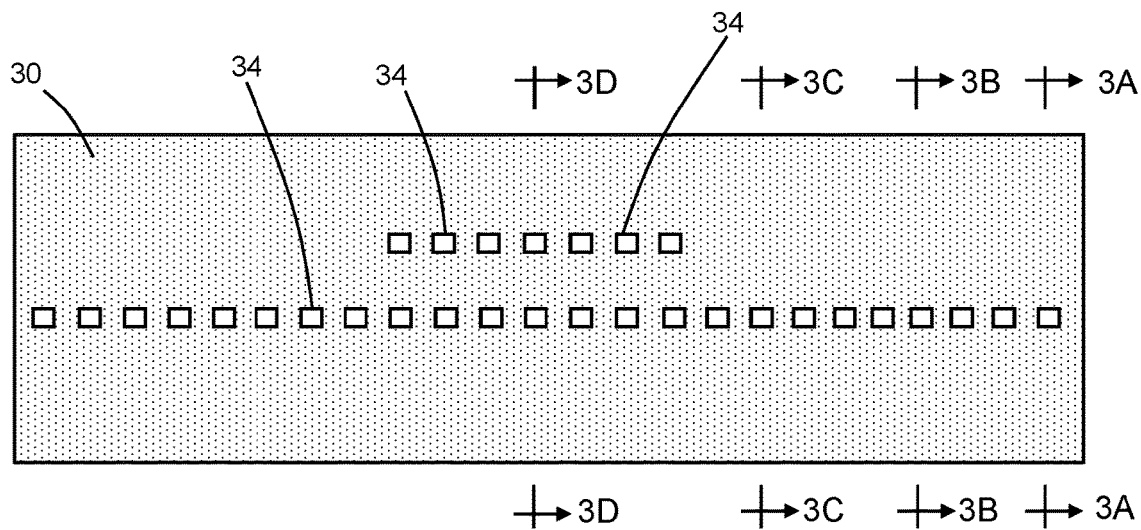
FIG. 3 is a top view of a structure at a fabrication stage of the processing method subsequent to FIGS. 2A-2D.
Figure 3A:
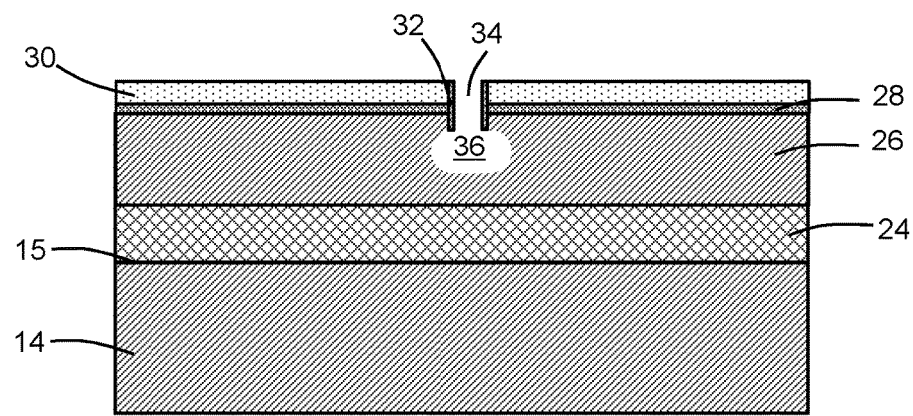
FIG. 3A is a cross-sectional view taken generally along line 3A-3A in FIG. 3.
Figure 3B:
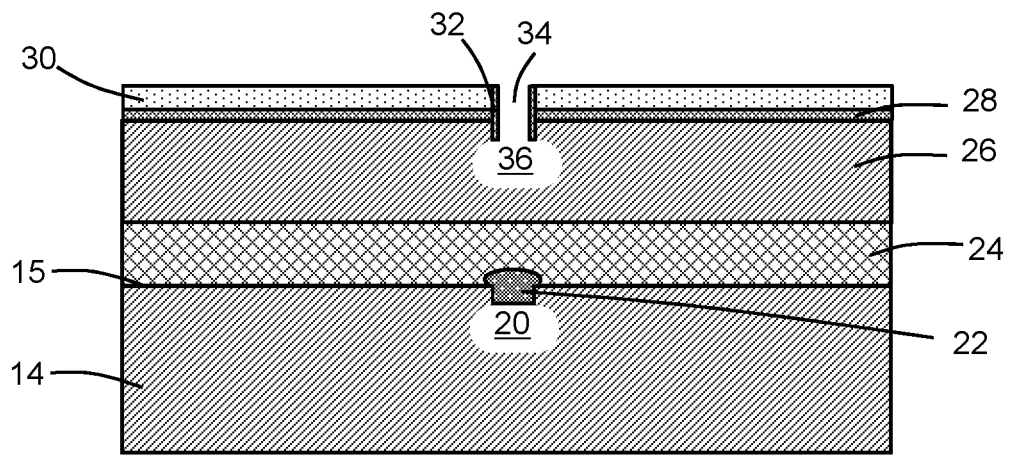
FIG. 3B is a cross-sectional view taken generally along line 3B-3B in FIG. 3.
Figure 3C:
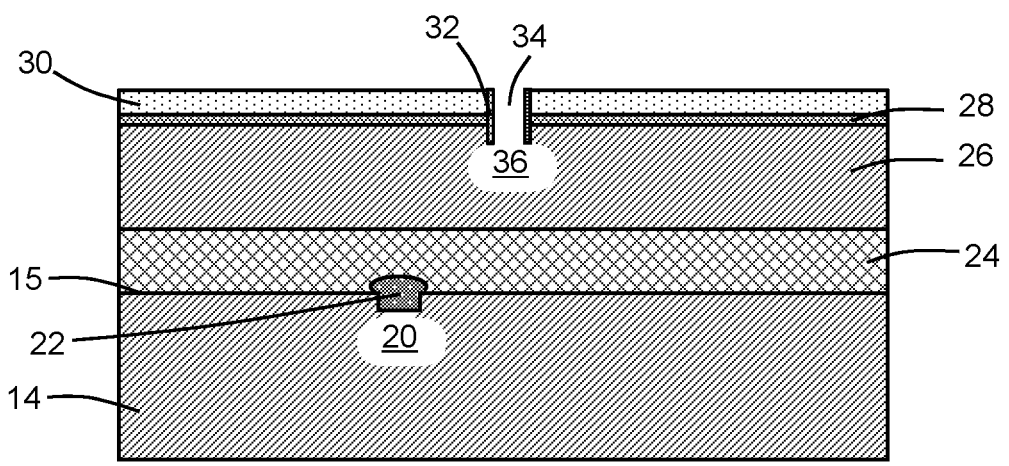
FIG. 3C is a cross-sectional view taken generally along line 3C-3C in FIG. 3.
Figure 3D:
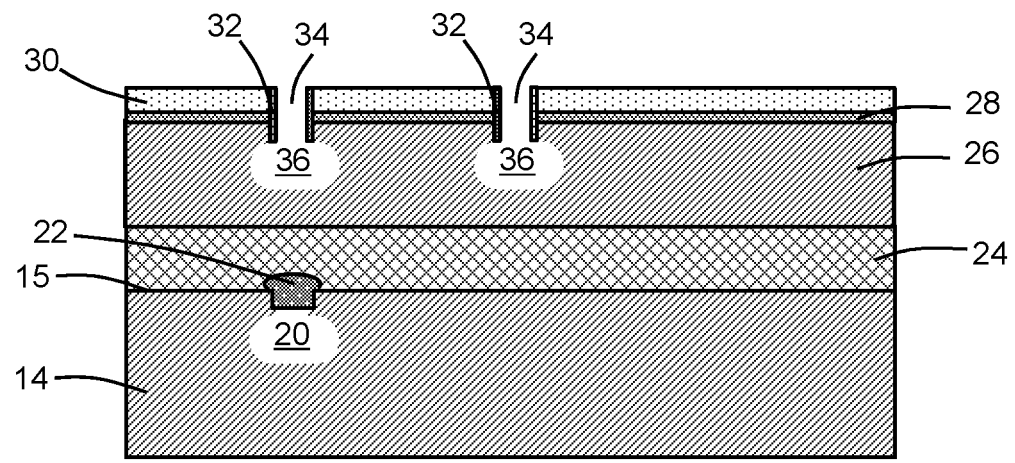
FIG. 3D is a cross-sectional view taken generally along line 3D-3D in FIG. 3.

With reference to FIGS. 1 and 1A-1D and in accordance with embodiments of the invention, pad layers 10, 12 are formed over a top surface 15 of a semiconductor substrate 14. In an embodiment, the semiconductor substrate 14 is a bulk substrate. The materials of the pad layers 10, 12 may be chosen to etch selectively to the semiconductor material of the semiconductor substrate 14 and to be readily removed at a subsequent fabrication stage. The pad layers 10, 12 operate as protection layers for the top surface 15 of the semiconductor substrate 14 during, for example, etching processes. The pad layer 10 may be composed of a dielectric material, such as silicon dioxide deposited by chemical vapor deposition (CVD). The pad layer 12 may be composed of a dielectric material, such as silicon nitride deposited by chemical vapor deposition. The semiconductor substrate 14 is usable to form the devices of an integrated circuit with front-end-of-line (FEOL) processing and may be a bulk wafer composed of a single-crystal semiconductor material, such as silicon.

The pad layers 10, 12 are patterned using lithography and etching, and are then used as a hardmask to pattern openings 18 that extend from the top surface 15 into the semiconductor substrate 14. The openings 18, which are arranged in a row, may be formed in the semiconductor substrate 14 using a directional etching process, such as reactive ion etching (ME), at the locations of openings in the patterned pad layers 10, 12. In an embodiment, the openings 18 may be arranged in a single row.

A liner 16 is applied to the surfaces bordering the openings 18. The liner 16 may be composed of a material that is removable selective to the semiconductor substrate 14, such as silicon dioxide that is removable selective to silicon. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process. Sections of the liner 16 are removed from the bottoms of the openings 18 with a directional etching process, such as reactive ion etching, which exposes the semiconductor material of the semiconductor substrate 14 at the bottom of each opening 18. Following the etching process, the semiconductor substrate 14 is covered by the liner 16 over a short vertical section of each opening 18.

Cavities 20 are formed in the semiconductor substrate 14 that extend downwardly and outwardly from the bottoms of the openings 18. The cavities 20 may be formed by performing an isotropic etching process having lateral and vertical etching components. The isotropic etching process may be a dry etching process that uses xenon difluoride ($XeF_2$) as a source gas. The liner 16 masks the openings 18 in the semiconductor substrate 14 and thereby prevents their enlargement by the etching process. The openings 18 are arranged in a vertical direction between the cavities 20 and the top surface 15 of the semiconductor substrate 14. The cavities 20 may be centered about their respective openings 18.

With reference to FIGS. 2A-2D in which like reference numerals refer to like features in FIGS. 1A-1D and at a subsequent fabrication stage, the pad layers 10, 12 and the liner 16 are removed after the openings 18 and cavities 20 are formed. A bake may be performed at a temperature of, for example, 800° C. in a reducing atmosphere (e.g., hydrogen) to remove native oxide from the semiconductor material of the semiconductor substrate 14 bordering the openings 18 and cavities 20.

Plugs 22 are formed inside the openings 18 that close and seal the cavities 20. To that end, a thin conformal layer of a semiconductor material, such as silicon-germanium, may be epitaxially grown as a liner on the surfaces of the semiconductor substrate 14 bordering the openings 18 and cavities 20. The thickness of the thin conformal layer is selected such that the openings 18 are not pinched-off. An epitaxial layer 24, which may be composed of a different semiconductor material (e.g., silicon) than the thin conformal layer, may then be epitaxially grown on the top surface 15 of the semiconductor substrate 14. The epitaxial layer 24 may be formed using a low temperature epitaxial (LTE) growth process, such as vapor phase epitaxy (VPE). During epitaxial growth, the semiconductor material constituting the epitaxial layer 24 will acquire the crystal orientation and crystal structure of the single-crystal semiconductor material of the semiconductor substrate 14, which serves as an epitaxial growth template establishing a crystal structure for the epitaxial layer 24. The epitaxial growth may cause the thin conformal layer to reflow and combine with the semiconductor material of the epitaxial layer 24 to form the plugs 22 inside the openings 18 and beneath the epitaxial layer 24. In an embodiment, the epitaxial layer 24 may be grown at a temperature of 850° C. to 1000° C. In an embodiment, the epitaxial layer 24 may be in direct contact with the top surface 15 of the semiconductor substrate 14. The epitaxial layer 24, which is self-planarized, may have a thickness selected to optimize its waveguide properties. Specifically, the epitaxial layer 24 conforms to the shape of the top surface of the plugs 22, which is illustrated as a convex shape in the representative embodiment but also may have a planar or concave shape.

The sealed cavities 20 define one or more airgaps that may be characterized by a permittivity or dielectric constant of near unity (i.e., vacuum permittivity). Each airgap may be filled by atmospheric air at or near atmospheric pressure, may be filled by another gas at or near atmospheric pressure, or may contain atmospheric air or another gas at a sub-atmospheric pressure (e.g., a partial vacuum).

The sealed cavities 20 are arranged in pattern that includes groups 17, 19, 21. The group 21 of sealed cavities 20, after subsequent fabrication stages, provides cladding for a passive waveguide arm of an electro-optic modulator. The groups 17 of sealed cavities 20, after subsequent fabrication stages, provide cladding for waveguide couplers arranged at opposite ends of the passive waveguide arm, and the groups 19 of sealed cavities 20, after subsequent fabrication stages, provides cladding for angled sections of the passive waveguide arm that connect with the waveguide couplers.

With reference to FIGS. 3 and 3A-3D in which like reference numerals refer to like features in FIGS. 2A-2D and at a subsequent fabrication stage, an epitaxial layer 26, which may be composed of a different semiconductor material (e.g., silicon) than the epitaxial layer 24, may then be epitaxially grown on a top surface of the epitaxial layer 24. The epitaxial layer 26 may be formed using a low temperature epitaxial (LTE) growth process, such as vapor phase epitaxy (VPE). During epitaxial growth, the semiconductor material constituting the epitaxial layer 26 will acquire the crystal orientation and crystal structure of the single-crystal semiconductor material of the epitaxial layer 24, which serves as an epitaxial growth template establishing a crystal structure for the epitaxial layer 26.

Pad layers 28, 30 are formed over a top surface of the epitaxial layer 26. The materials of the pad layers 28, 30 may be chosen to etch selectively to the semiconductor material of the epitaxial layer 26 and to be readily removed at a subsequent fabrication stage. The pad layers 28, 30 operate as protection layers for the top surface of the epitaxial layer 26 during, for example, etching processes. The pad layer 28 may be composed of a dielectric material, such as silicon dioxide deposited by chemical vapor deposition. The pad layer 30 may be composed of a dielectric material, such as silicon nitride deposited by chemical vapor deposition. The pad layers 28, 30 are patterned using lithography and etching and then used to form corresponding openings 34 that extend into the epitaxial layer 26. The openings 34, which are arranged in a row, may be formed in the epitaxial layer 26 using a directional etching process, such as reactive ion etching, at the locations of openings in the patterned pad layers 28, 30.

A liner 32 is applied to the surfaces bordering the openings 34. The liner 32 may be composed of a material that is removable selective to the epitaxial layer 26, such as silicon dioxide that is removable selective to silicon. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process. Sections of the liner 32 are removed from the bottoms of the openings 34 with a directional etching process, such as reactive ion etching, which exposes the semiconductor material of the epitaxial layer 26 at the bottom of each opening 34. Following the etching process, the epitaxial layer 26 is covered by the liner 32 over a short vertical section of each opening 34.

Cavities 36 are formed in the epitaxial layer 26 that extend downwardly and outwardly from the bottoms of the openings 34. The cavities 36 may be formed by performing an isotropic etching process having lateral and vertical etching components. The isotropic etching process may be a dry etching process that uses xenon difluoride as a source gas. The liner 32 masks the openings 34 in the epitaxial layer 26 and thereby prevents their enlargement by the etching process. The openings 34 are arranged in a vertical direction between the cavities 36 and the top surface of the epitaxial layer 26. The cavities 36 may be centered about their respective openings 34.

With reference to FIGS. 4A-4D in which like reference numerals refer to like features in FIGS. 3A-3D and at a subsequent fabrication stage, the pad layers 28, 30 and the liner 32 are removed after the openings 34 and cavities 36 are formed. A bake may be performed at a temperature of, for example, 800° C. in a reducing atmosphere (e.g., hydrogen) to remove native oxide from the semiconductor material of the epitaxial layer 26 bordering the openings 34 and cavities 36.

Plugs 38 are formed inside the openings 34 that close and seal the cavities 36. To that end, a thin conformal layer of a semiconductor material, such as silicon-germanium (SiGe), may be epitaxially grown as a liner on the surfaces of the epitaxial layer 26 bordering the openings 34 and cavities 36. The thickness of the thin conformal layer is selected such that the openings 34 are not pinched-off. An epitaxial layer 40, which may be composed of a different semiconductor material (e.g., silicon) than the thin conformal layer, may then be epitaxially grown on the top surface of the epitaxial layer 26. The epitaxial layer 40 may be formed using a low temperature epitaxial (LTE) growth process, such as vapor phase epitaxy (VPE). During epitaxial growth, the semiconductor material constituting the epitaxial layer 40 will acquire the crystal orientation and crystal structure of the single-crystal semiconductor material of the epitaxial layer 26, which serves as an epitaxial growth template establishing a crystal structure for the epitaxial layer 40. The epitaxial growth may cause the thin conformal layer to reflow and combine with the semiconductor material of the epitaxial layer 40 to form the plugs 38 inside the openings 34 and beneath the epitaxial layer 40. In an embodiment, the epitaxial layer 40 may be grown at a temperature of 850° C. to 1000° C. In an embodiment, the epitaxial layer 40 may be in direct contact with the top surface of the epitaxial layer 26. The epitaxial layer 40, which is self-planarized, may have a thickness selected to optimize its waveguide properties. Specifically, the epitaxial layer 40 conforms to the shape of the top surface of the plugs 38, which is illustrated as a convex shape in the representative embodiment but also may have a planar or concave shape.

The sealed cavities 36 define one or more airgaps that may be characterized by a permittivity or dielectric constant of near unity (i.e., vacuum permittivity). Each airgap may be filled by atmospheric air at or near atmospheric pressure, may be filled by another gas at or near atmospheric pressure, or may contain atmospheric air or another gas at a sub-atmospheric pressure (e.g., a partial vacuum).

With reference to FIGS. 5, 5A-5D in which like reference numerals refer to like features in FIGS. 4A-4D and at a subsequent fabrication stage, the epitaxial layers 26, 40 are patterned by lithography and etching processes. To that end, pad layers 42, 44 similar to pad layers 10, 12 are formed over the epitaxial layer 40, and an etch mask 46 is applied over pad layer 44. The etch mask 46 may be formed by lithography in which a lithography stack including a photoresist layer is applied, exposed to a pattern of radiation projected through a photomask, and developed to form a pattern of features that are transferred by etching to the pad layers 42, 44 and subsequently to the epitaxial layers 26, 40.

The patterned pad layers 42, 44 are used as a hardmask for an etching process, such as a reactive-ion etching process, that patterns the epitaxial layers 26, 40. The etching process patterning the epitaxial layers 26, 40 may be conducted in a single etching step or multiple etching steps. In an embodiment, the etching process may penetrate completely through the epitaxial layer 40 and at least partially through the epitaxial layer 26 to a depth that is below the bottom of the sealed cavities 36. In the representative embodiment, the etching process may penetrate completely through the epitaxial layer 40 and completely through the epitaxial layer 26 to a top surface of the epitaxial layer 24, which is arranged below the bottom of the sealed cavities 36. The etch mask 46 is stripped following the performance of the etching process.

Figure 5:
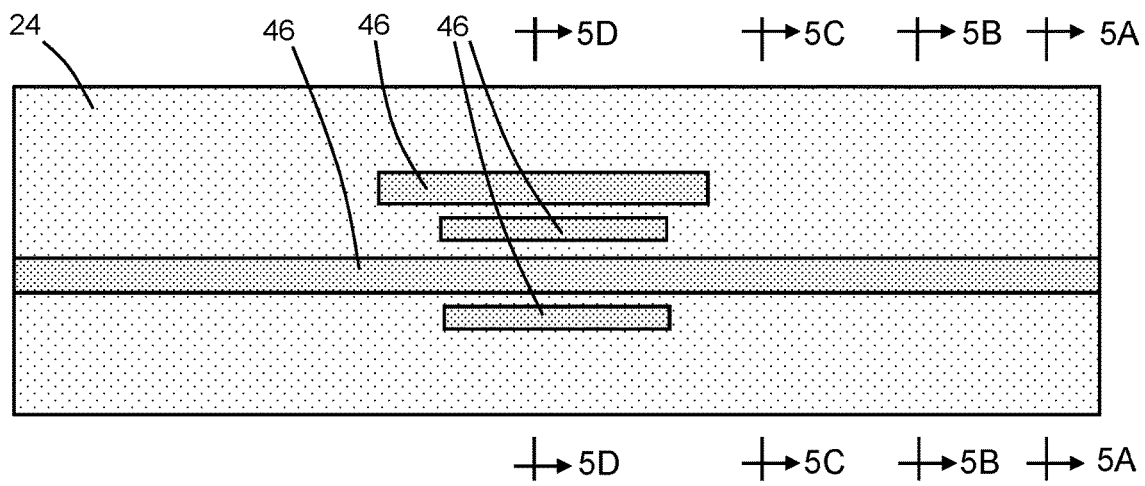
FIG. 5 is a top view of a structure at a fabrication stage of the processing method subsequent to FIGS. 4A-4D.
Figure 5A:
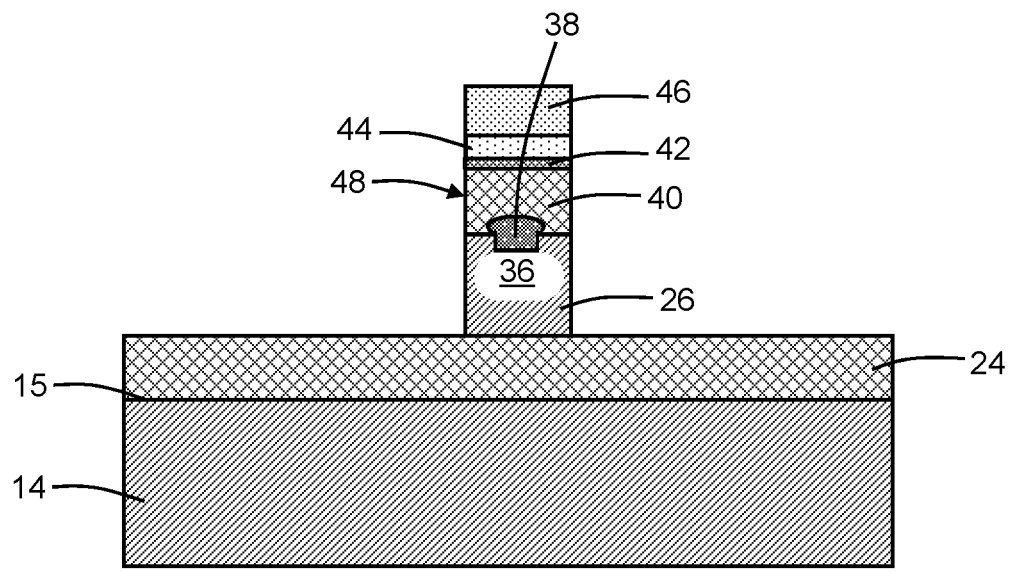
FIG. 5A is a cross-sectional view taken generally along line 5A-5A in FIG. 5.
Figure 5B:
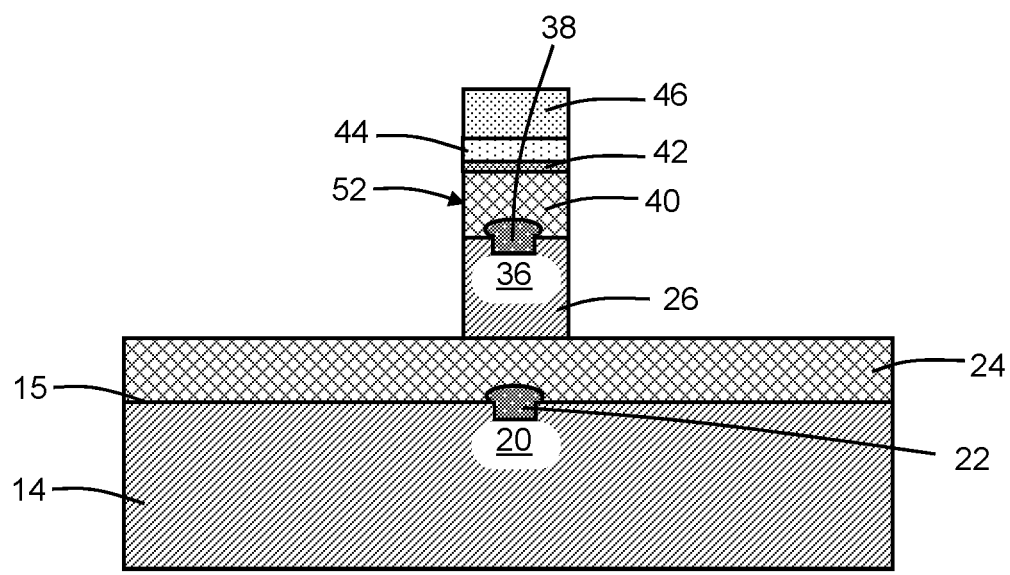
FIG. 5B is a cross-sectional view taken generally along line 5B-5B in FIG. 5.
Figure 5C:
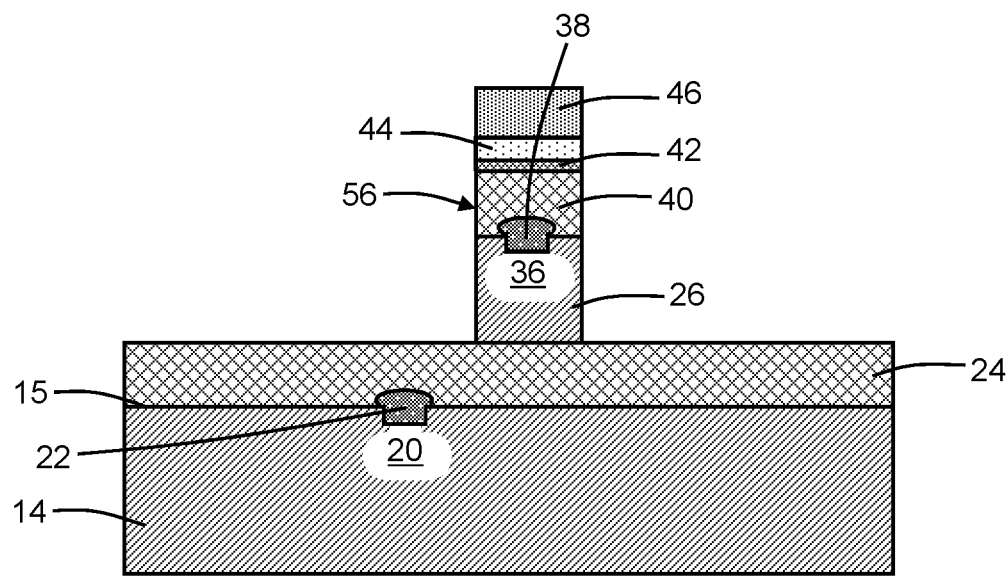
FIG. 5C is a cross-sectional view taken generally along line 5C-5C in FIG. 5.
Figure 5D:
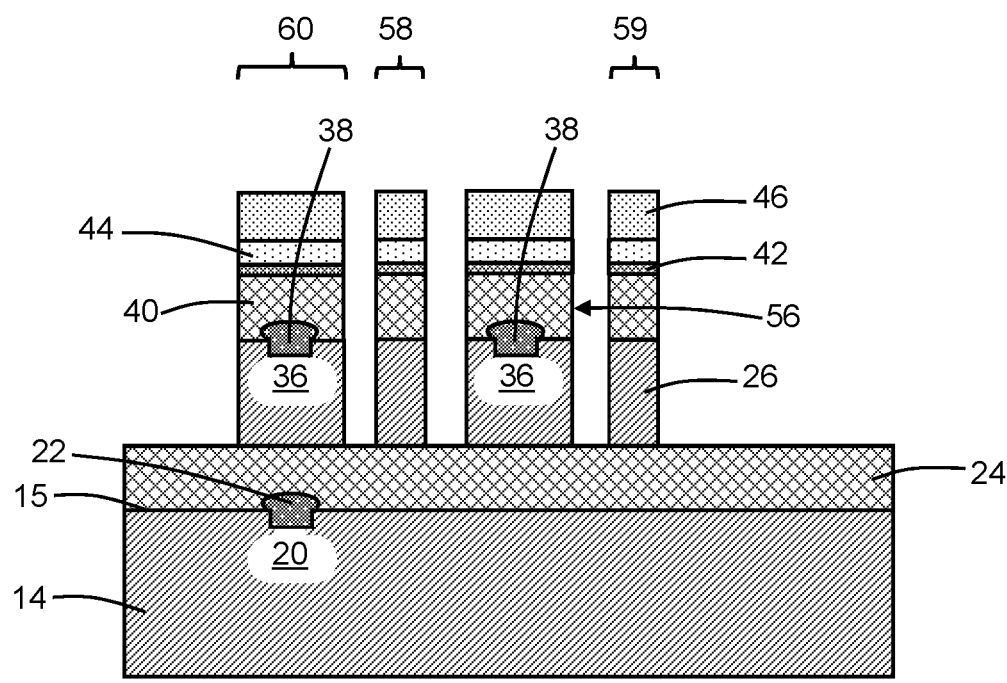
FIG. 5D is a cross-sectional view taken generally along line 5D-5D in FIG. 5.
Figure 7:
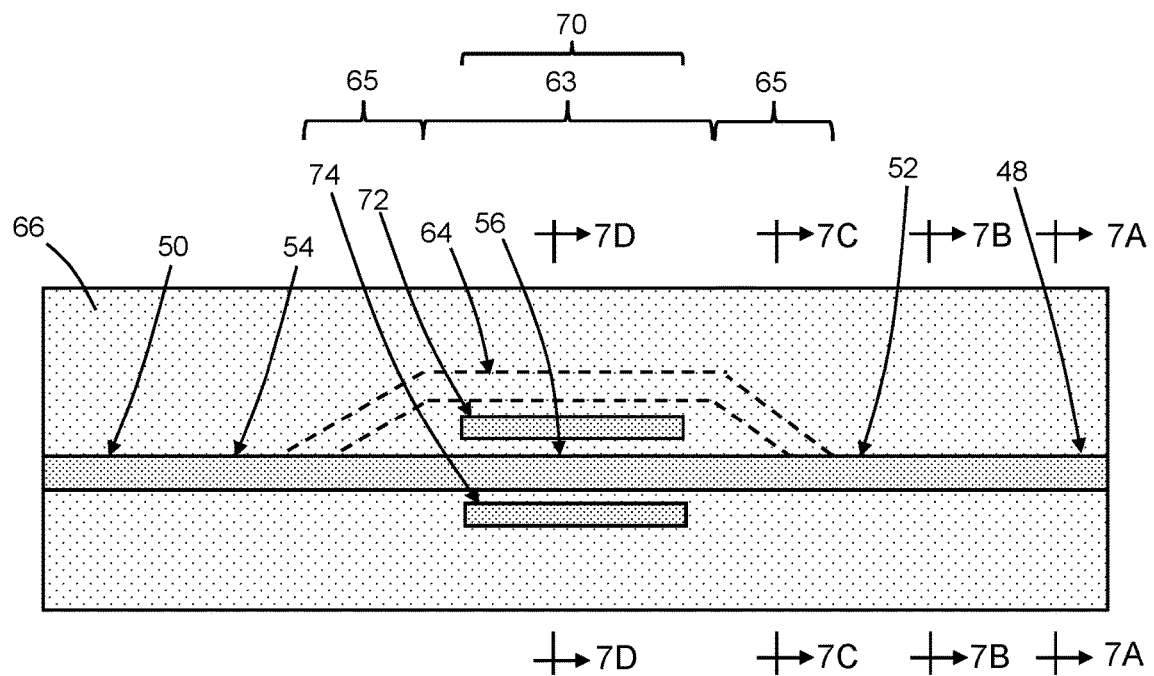
FIG. 7 is a top view of a structure at a fabrication stage of the processing method subsequent to FIGS. 6A-6D.
Figure 7A:
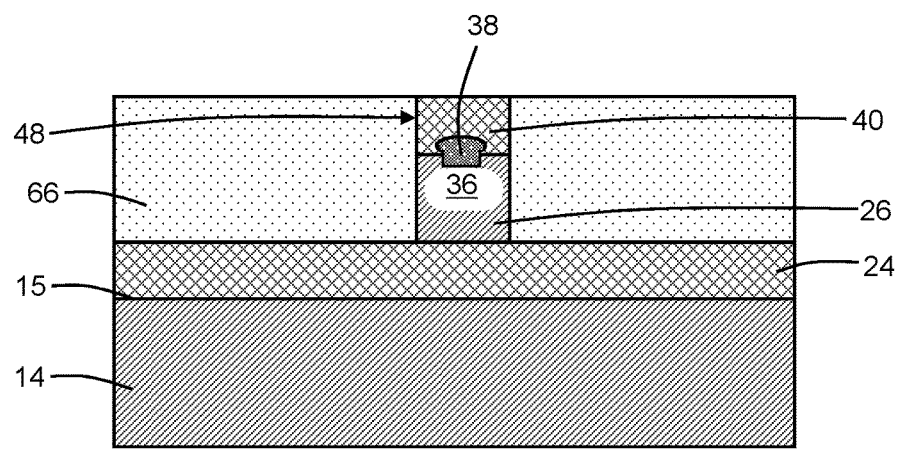
FIG. 7A is a cross-sectional view taken generally along line 7A-7A in FIG. 7.
Figure 7B:
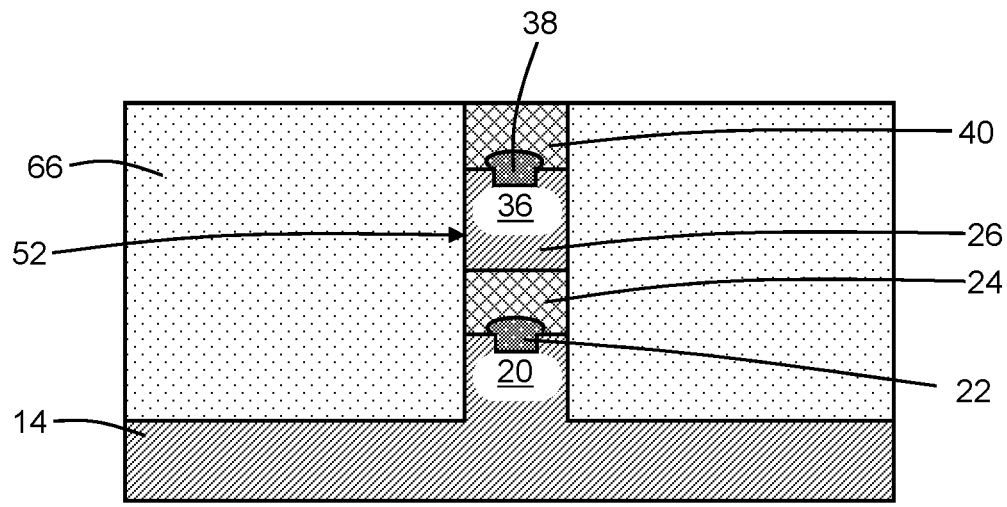
FIG. 7B is a cross-sectional view taken generally along line 7B-7B in FIG. 7.
Figure 7C:
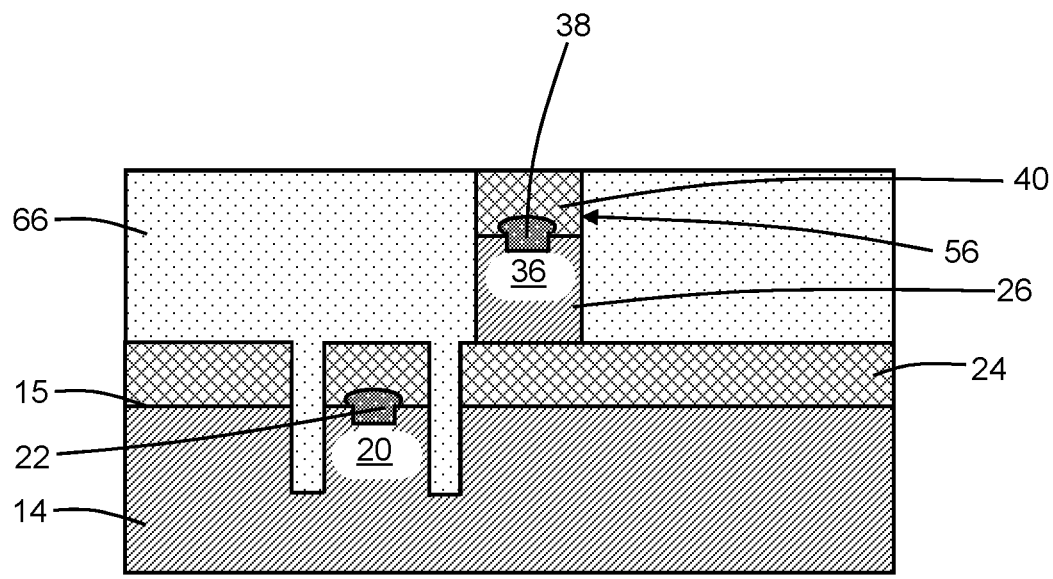
FIG. 7C is a cross-sectional view taken generally along line 7C-7C in FIG. 7.

The sealed cavities 36 in the epitaxial layer 26 are preserved and not opened by the masked etching process that patterns the epitaxial layer 26 through the layout of the etch mask 46. A waveguide core is defined by the patterned section of the epitaxial layer 40, the plugs 38 sealing the cavities 36, and a section of the epitaxial layer 26 between the cavities 36 and the interface between the epitaxial layers 26, 40. The sealed cavities 36 arranged beneath the waveguide core supply a lower cladding layer. The waveguide core is distributed among sections defining an input waveguide 48, an output waveguide 50 (FIG. 7) similar to the input waveguide 48, an upper section of a waveguide coupler 52 (FIG. 7), an upper section of a waveguide coupler 54 (FIG. 7) similar to the upper section of the waveguide coupler 52, and an active waveguide arm 56 of an electro-optic modulator. As best shown in FIG. 5A, the input waveguide 48 is not arranged over the cavities 20, and a similar arrangement is present for the output waveguide 50. As best shown in FIG. 5B, the upper section of the waveguide coupler 52 is arranged over the cavities 20. As best shown in FIGS. 5C and 5D, the active waveguide arm 56 is also not arranged over the cavities 20.

In addition to the waveguide core, sections 58, 59, 60 of the epitaxial layers 26, 40 are also preserved by the masked etching process that patterns the epitaxial layer 26 through the layout of the etch mask 46. The sections 58, 59 are subsequently used to form carrier injection sources, and the section 60 includes sealed cavities 36 that provide cladding for a subsequently-formed passive waveguide arm.

With reference to FIGS. 6A-6D in which like reference numerals refer to like features in FIGS. 5A-5D and at a subsequent fabrication stage, the epitaxial layer 24 is patterned by lithography and etching processes. To that end, an etch mask 62 is applied in which a lithography stack including a photoresist layer is formed, exposed to a pattern of radiation projected through a photomask, and developed to form a pattern of features that are transferred by etching to the epitaxial layer 24. With the etch mask 62 in place, an etching process, such as a reactive-ion etching process, is used to pattern the epitaxial layer 24. The etching process may be conducted in a single etching step or multiple etching steps, and the etching process may penetrate completely through the epitaxial layer 24 to the top surface 15 of the substrate 14. The etch mask 62 is stripped following the performance of the etching process.

Figure 6A:
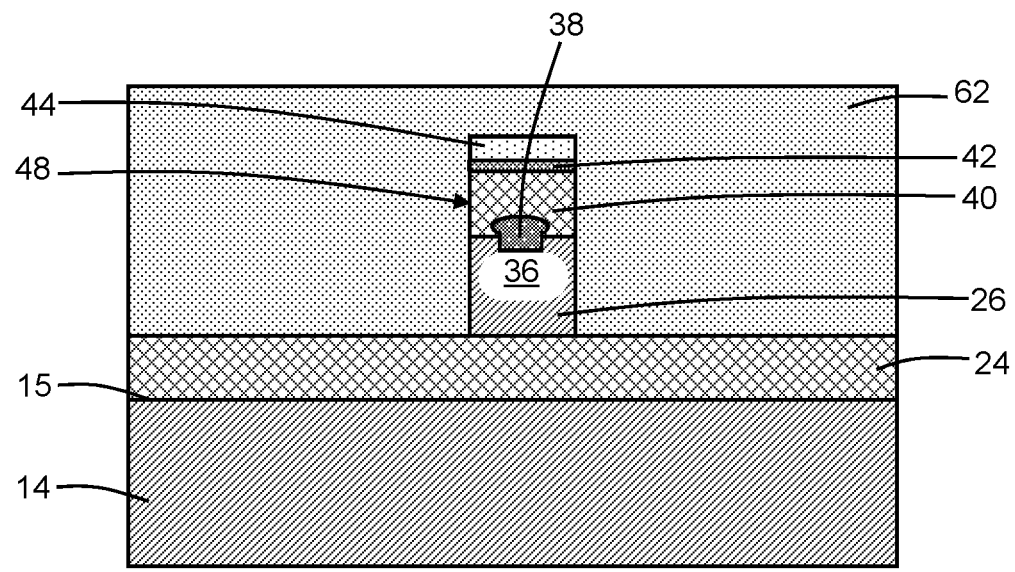
FIGS. 6A-6D are cross-sectional views of the structure at a fabrication stage subsequent to FIGS. 5A-5D.
Figure 6B:
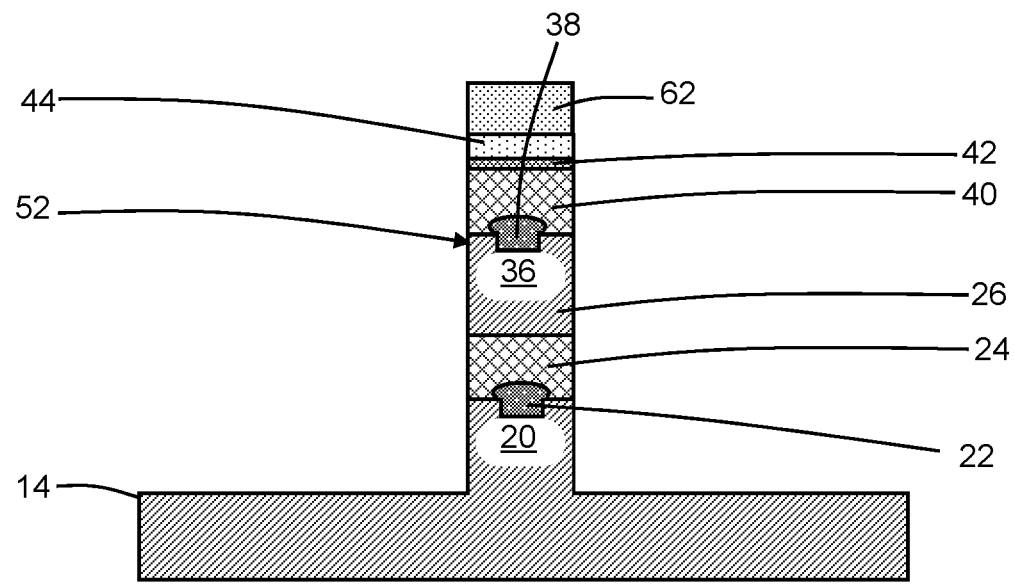
Figure 6C:
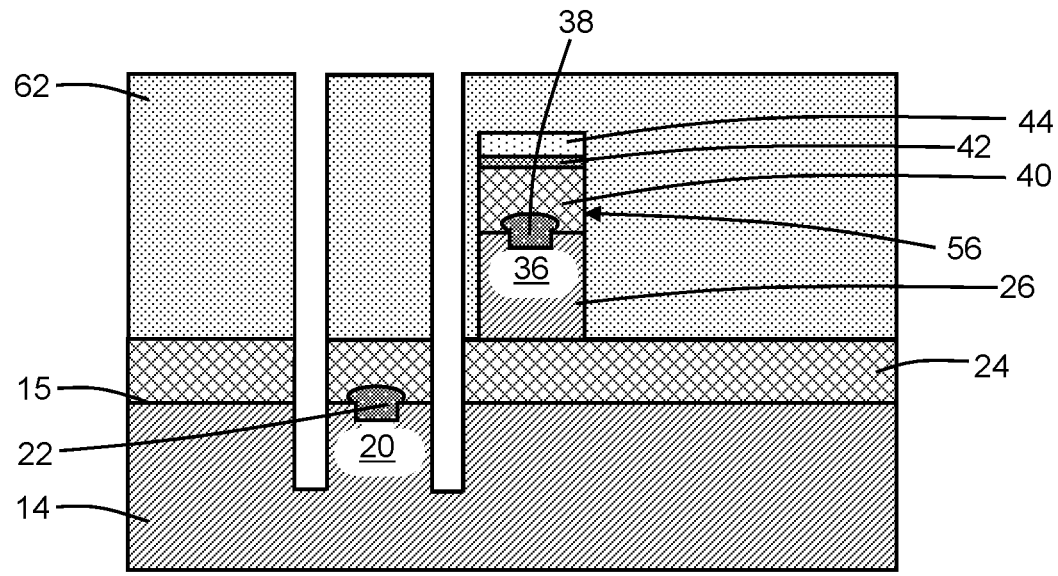
Figure 6D:
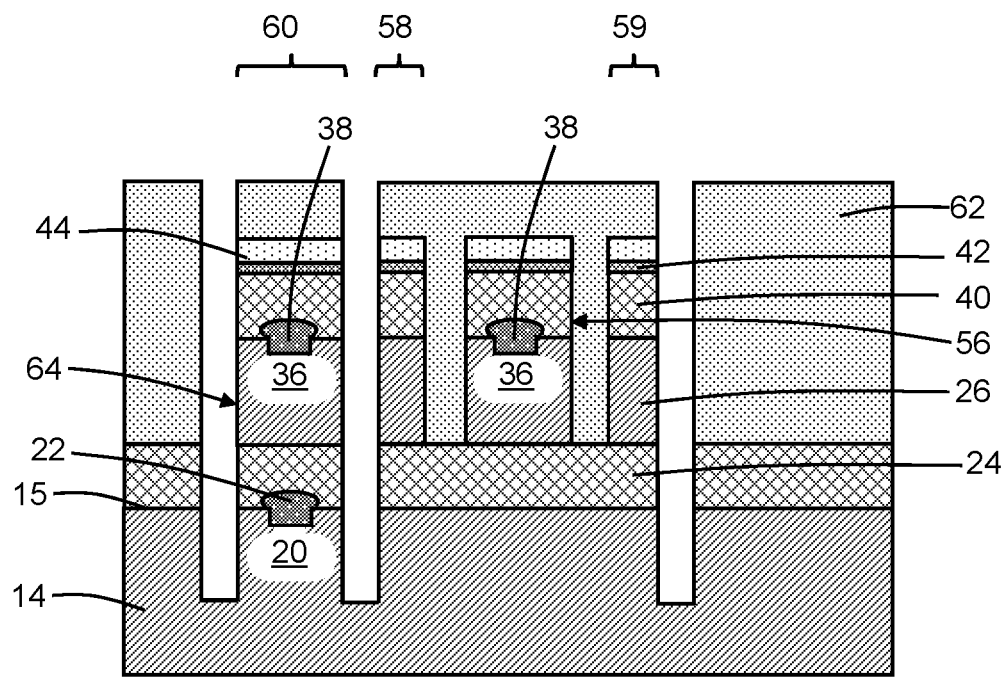

The sealed cavities 20 in the substrate 14 are preserved by the masked etching process that patterns the epitaxial layer 24 through the layout of the etch mask 62. A waveguide core is defined by the patterned section of the epitaxial layer 24, the plugs 22 sealing the cavities 20, and a section of the epitaxial layer 26 between the cavities 36 and the interface between the epitaxial layers 24, 26. The sealed cavities 20 arranged beneath the waveguide core supply a lower cladding layer. The waveguide core is distributed among sections defining a lower section of the waveguide coupler 52 (FIG. 7), a lower section of the waveguide coupler 54 (FIG. 7) similar to the lower section of the waveguide coupler 52, and a passive waveguide arm 64 of the electro-optic modulator. As best shown in FIGS. 6B and 6D, the cavities 36 and the cavities 20 respectively provide upper and lower cladding for the lower sections of the waveguide couplers 52, 54 and the passive waveguide arm 64. In the waveguide couplers 52, 54, the upper and lower waveguide cores are arranged in a stack. The passive waveguide arm 64 includes a straight section 63 arranged parallel to the active waveguide arm 56 and bent or angled sections 65 at the opposite ends of the straight section 63. The angled sections 65 respectively connect the straight section 63 with the waveguide couplers 52, 54.

The waveguide coupler 52 is configured to transfer optical signals arriving at the input waveguide 48 from the input waveguide 48 to an angled section of the passive waveguide arm 64 providing an input port of the passive waveguide arm 64. Due to splitting within the waveguide coupler 52, optical signals also propagate through the active waveguide arm 56. The optical signals propagate through the waveguide coupler 54 and are transferred through the angled section of the passive waveguide arm 64 (i.e., the output port of the passive waveguide arm 64) to the output waveguide 50. The optical signals propagating in the passive waveguide arm 64 and propagating through the active waveguide arm 56 combine in the waveguide coupler 54 and then exit through the output waveguide 50.

The waveguide cores of the active waveguide arm 56 and the passive waveguide arm 64 are not coplanar and are not formed in the same semiconductor layer. Instead, the waveguide cores of the active waveguide arm 56 and the passive waveguide arm 64 are formed in different planes with the waveguide core of the active waveguide arm 56 arranged over the waveguide core of the passive waveguide arm 64. Specifically, the waveguide core of the passive waveguide arm 64 is defined in the epitaxial layer 24 and the epitaxial layer 26 below the cavities 36, and the waveguide core of the active waveguide arm 56 is defined in the epitaxial layer 40 and the epitaxial layer 26 over the cavities 36.

With reference to FIGS. 7, 7A-7D in which like reference numerals refer to like features in FIGS. 6A-6D and at a subsequent fabrication stage, a dielectric layer 66 is deposited and planarized by chemical-mechanical polishing (CMP) to remove topography and provide a planar surface. The dielectric layer 66 may be composed of a dielectric material, such as an oxide of silicon (e.g., silicon dioxide), deposited by chemical vapor deposition to provide gap-fill about the input waveguide 48, the output waveguide 50, the waveguide couplers 52, 54, and active waveguide arm 56 and passive waveguide arm 64 of the electro-optic modulator. The dielectric layer provides lateral cladding for the input waveguide 48, the output waveguide 50, the waveguide couplers 52, 54, and active waveguide arm 56 and passive waveguide arm 64 of the electro-optic modulator.

A p-type dopant and an n-type dopant are introduced into lengthwise portions of the active waveguide arm 56 arranged between the sections 58, 59 of the epitaxial layers 26, 40 to form an electrically-active section 70 of the active waveguide arm 56. The p-type dopant is also introduced into the section 58 of the epitaxial layers 26, 40 to form a carrier injection source 72, and the n-type dopant is also introduced into the section 59 of the epitaxial layers 26, 40 to form a carrier injection source 74. The p-type dopant is also introduced into the epitaxial layer 24 beneath the carrier injection source 72 and the p-type portion of the electrically-active section 70 of the active waveguide arm 56, and the n-type dopant is also introduced into the epitaxial layer 24 beneath the carrier injection source 74 and the n-type portion of the electrically-active section 70 of the active waveguide arm 56. The n-type dopant and the p-type dopant may be introduced by separate masked implantations of ions containing either the n-type dopant or the p-type dopant under a given set of implantation conditions (e.g., ion species, dose, kinetic energy, implantation angle) into the epitaxial layer 24, the electrically-active section 70 of the active waveguide arm 56, and the sections 58, 59 of the epitaxial layers 26, 40. The n-type portion of the electrically-active section 70 of the active waveguide arm 56 and the p-type portion of the electrically-active section 70 of the active waveguide arm 56 converge along an interface 76 at which the conductivity type of the semiconductor material changes to provide a p-n junction.

With reference to FIGS. 8A-8D in which like reference numerals refer to like features in FIGS. 7A-7D and at a subsequent fabrication stage, an interconnect structure 80 may be formed over the dielectric layer 66. The interconnect structure 80 may include one or more interlayer dielectric layers composed of dielectric materials such as silicon dioxide. The interconnect structure 80 may also include metallization composed of, for example, silicide, tungsten, copper, and/or cobalt that may be arranged in the one or more interlayer dielectric layers. For example, the interconnect structure 80 may include contacts 82 that extend to the carrier injection sources 72, 74. The closest dielectric layer of the interconnect structure 80, which may be composed of silicon dioxide, provides an upper cladding for the input waveguide 48, the output waveguide 50 (FIG. 7), the upper section of the waveguide coupler 52, the upper section of the waveguide coupler 54 (FIG. 7), and the active waveguide arm 56 of the electro-optic modulator.

The electro-optic modulator in accordance with embodiments of the invention may a component on a photonics chip that is fabricated using a bulk substrate rather than a more costly silicon-on-insulator wafer. The sealed cavities 20 provide cladding that is substituted for the cladding otherwise provided by a buried insulator layer of the silicon-on-insulator wafer. The electro-optic modulator has a Mach-Zehnder interferometer geometry in which an optical path represented by the active waveguide arm 56 is separated vertically from an optical path represented by the passive waveguide arm 64, which differs from conventional arrangements. The cavities 20 are localized cavities to the waveguide couplers 52, 54 and the passive waveguide arm 64. The cavities 36 are localized to the waveguide couplers 52, 54 and the active waveguide arm 56. In the waveguide couplers 52, 54, the cavities 36 are stacked with the cavities 20.

During operation, p-type carriers are injected from the carrier injection source 72 into the p-type portion of the electrically-active section 70 of the active waveguide arm 56 and n-type carriers are injected from the carrier injection source 74 into the n-type portion of the electrically-active section 70 of the active waveguide arm 56. The index of refraction of the electrically-active section 70 of the active waveguide arm 56 changes in response to the carrier injection. The optical signals from the active waveguide arm 56 and passive waveguide arm 64 recombine at the output of the electro-optic modulator and either constructively or destructively interfere to respectively represent the on or off states of an electro-optic switch.

Figure 4A:
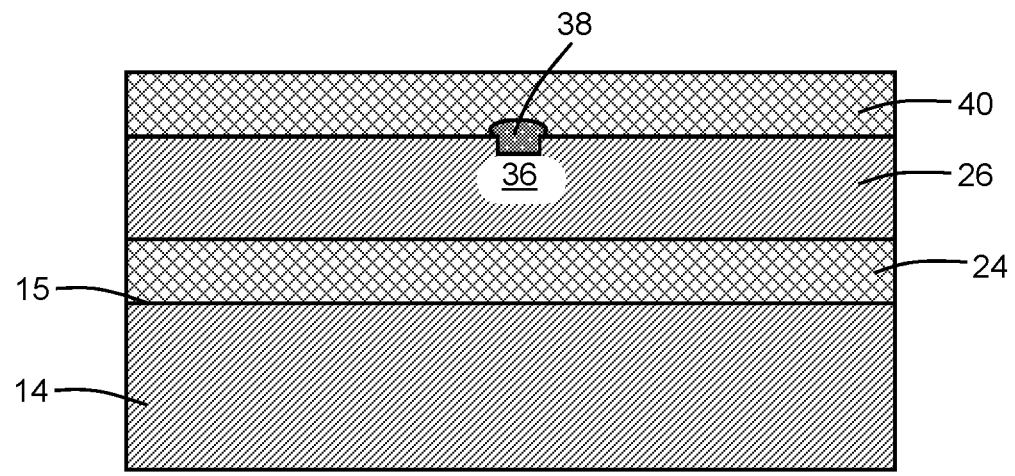
FIGS. 4A-4D are cross-sectional views of the structure at a fabrication stage subsequent to FIGS. 3A-3D.
Figure 4B:
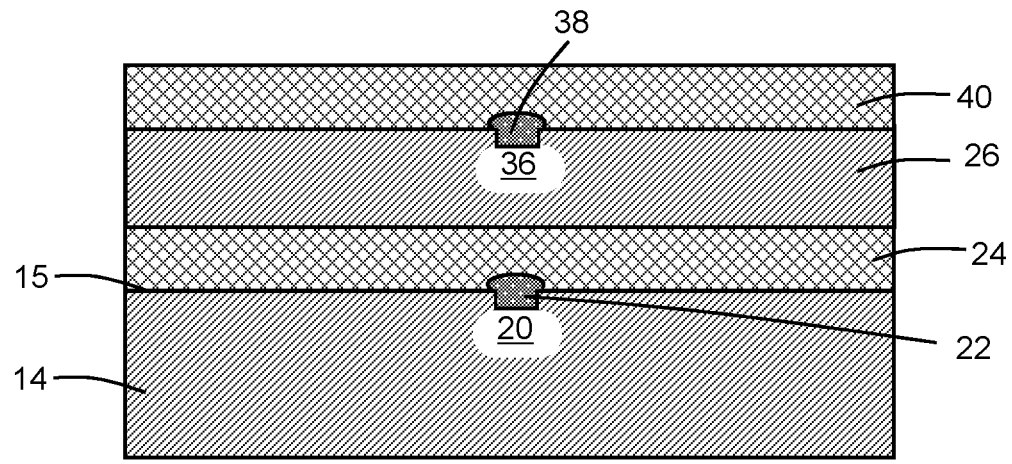
Figure 4C:
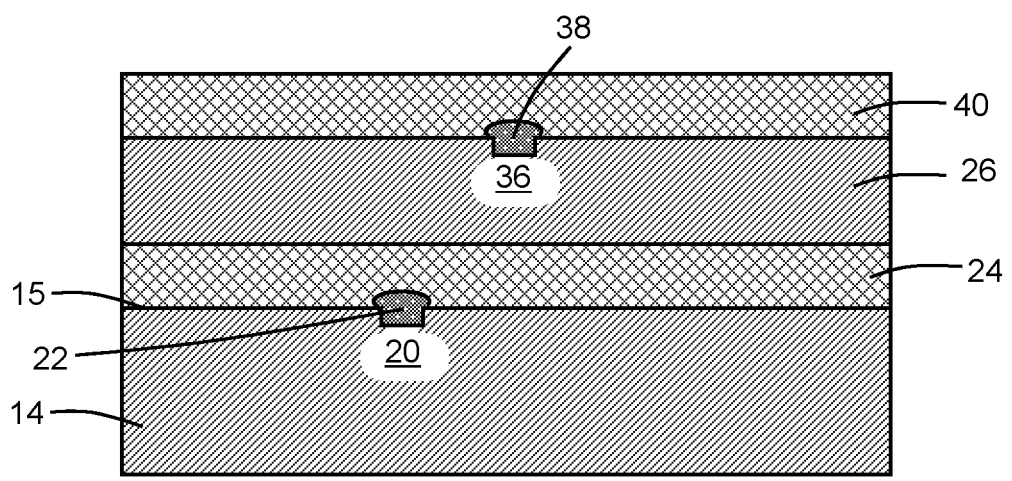
Figure 4D:
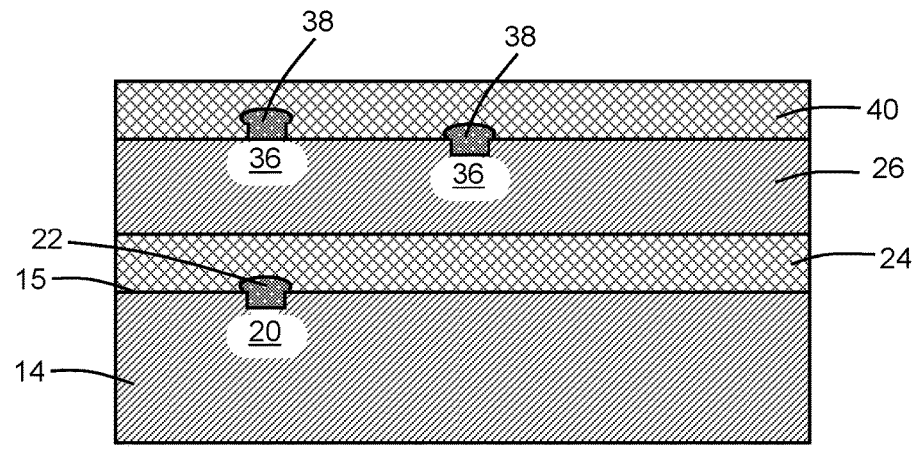
Figure 9:
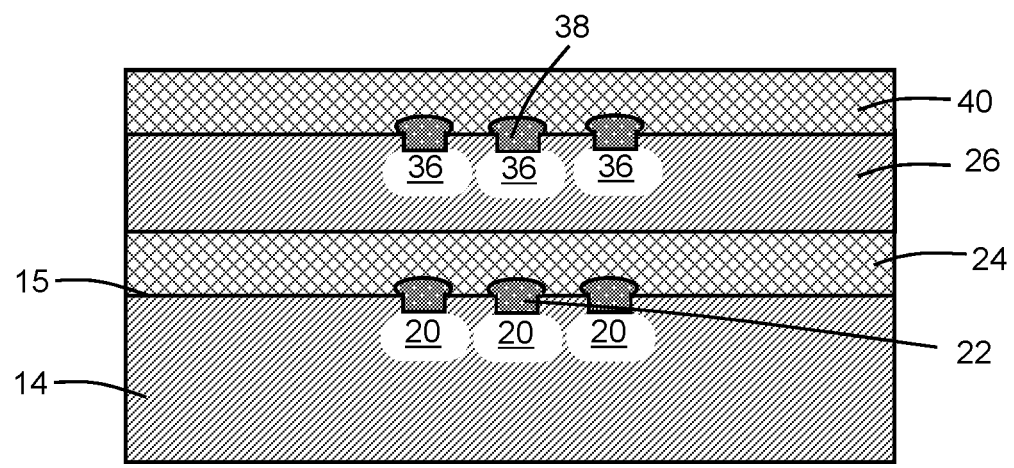
FIGS. 9-10 are cross-sectional views of a structure at fabrication stages of a processing method in accordance with alternative embodiments of the invention.

With reference to FIG. 9 in which like reference numerals refer to like features in FIG. 4B and in accordance with alternative embodiments, the cavities 20 may be arranged in multiple rows, instead of a single row, and the multiple rows may have a parallel arrangement, as illustrated for the waveguide coupler 52. The cavities 20 may be unmerged such that respective intervening portions of the semiconductor material of the substrate 14 provide partitions. The multi-row arrangement is initiated during the lithography and etching processes by forming the openings 18 in multiple rows.

Similarly, the cavities 36 may be arranged in multiple rows, instead of a single row, and the multiple rows may have a parallel arrangement. The cavities 36 may be unmerged such that respective intervening portions of the semiconductor material of the epitaxial layer 40 provide partitions. The multi-row arrangement is initiated during the lithography and etching processes by forming the openings 34 in multiple rows.

In an alternative embodiments, only the cavities 20 may be arranged in multiple rows with the cavities 36 being arranged in a single row. In an alternative embodiments, only the cavities 36 may be arranged in multiple rows with the cavities 20 being arranged in a single row.

Figure 10:
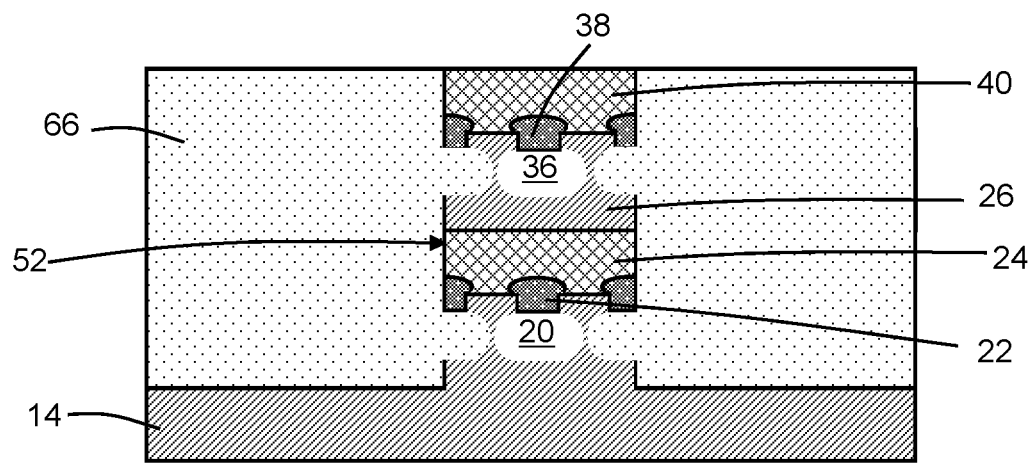

With reference to FIG. 10 in which like reference numerals refer to like features in FIG. 9, processing continues as described hereinabove. The cavities 20 in the peripheral rows and the cavities 36 in the peripheral rows may be opened, but not completely removed, by the etching processes forming the upper and lower sections of the waveguide coupler 52. Portions of the deposited dielectric layer 66 fill the opened cavities 20, 36 in the respective peripheral rows, while the cavities 20, 36 in the central rows remain sealed and form airgaps that define cladding.

The cavities 36 of the input waveguide 48 and the output waveguide 50, the cavities 20, 36 waveguide coupler 54, the cavities 36 of the active waveguide arm 56 of the electro-optic modulator, and/or the cavities 20 of the passive waveguide arm 64 of the electro-optic modulator may be provided in multiple rows as illustrated for the waveguide coupler 52, and may be opened and filled with dielectric material from the deposited dielectric layer 66.

Figure 11:
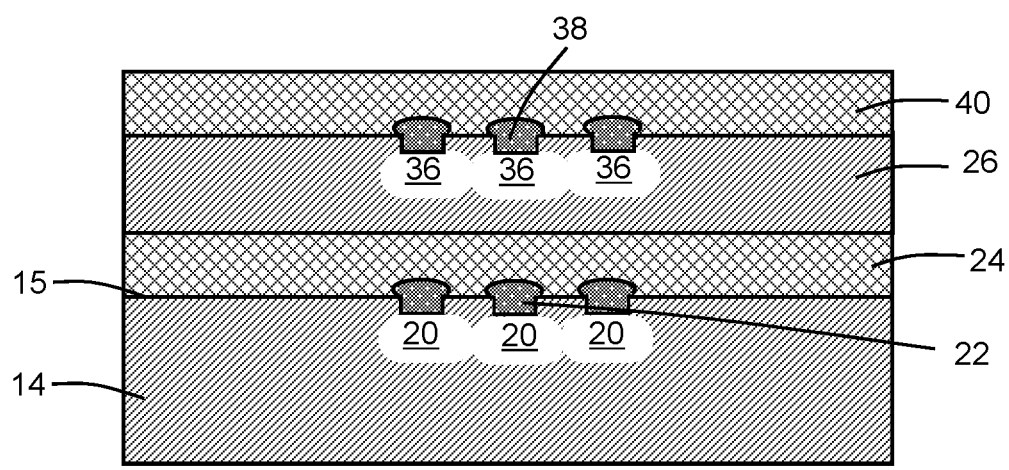
FIGS. 11-12 is a cross-sectional view of a structure at fabrication stages of a processing method in accordance with alternative embodiments of the invention.

With reference to FIG. 11 in which like reference numerals refer to like features in FIG. 9 and in accordance with alternative embodiments, the multiple rows of cavities 20 may be merged during the related isotropic etching process and/or the multiple rows of cavities 36 may be merged during the related isotropic etching process. Merger of the cavities 20 and/or the cavities 36 provides continuous open spaces that are contiguous.

Figure 12:
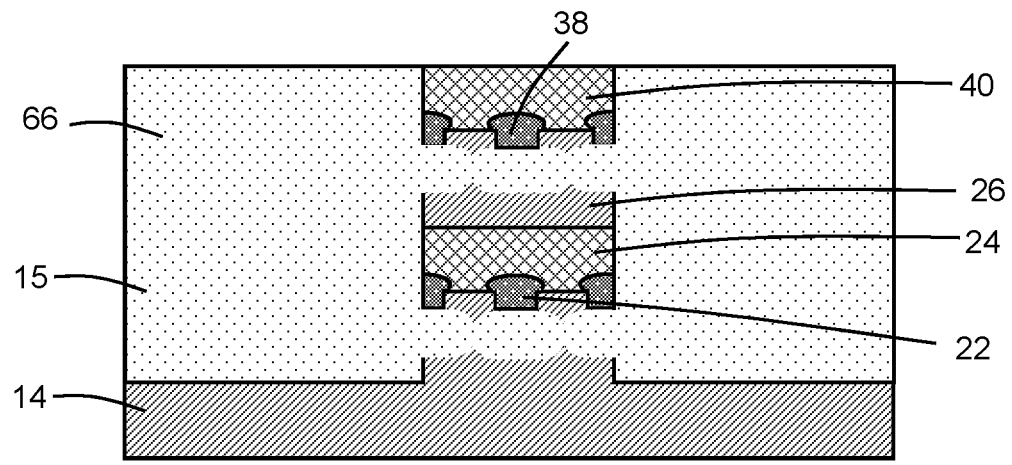

With reference to FIG. 12 in which like reference numerals refer to like features in FIG. 11, processing continues as described hereinabove. The cavities 20 in the peripheral rows and the cavities 36 in the peripheral rows may be opened, but not completely removed, by the etching processes forming the upper and lower sections of the waveguide coupler 52. Portions of the deposited dielectric layer 66 fill the opened merged cavities 20, 36 in the respective peripheral rows, and the dielectric material in the merged cavities 20 and in the merged cavities 36 provide cladding.

The cavities 36 of the input waveguide 48 and the output waveguide 50, the cavities 20, 36 waveguide coupler 54, the cavities 36 of the active waveguide arm 56 of the electro-optic modulator, and/or the cavities 20 of the passive waveguide arm 64 of the electro-optic modulator may be provided in multiple rows as illustrated for the waveguide coupler 52, and may be opened and filled with dielectric material from the deposited dielectric layer 66.

Figure 7D:
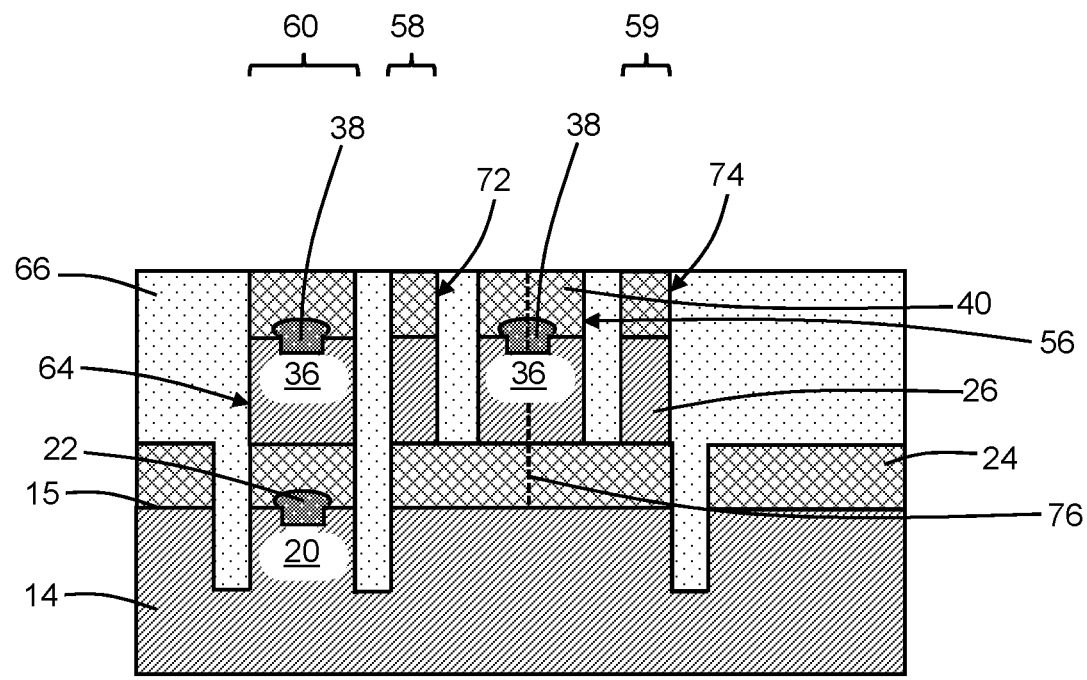
FIG. 7D is a cross-sectional view taken generally along line 7D-7D in FIG. 7.
Figure 8A:
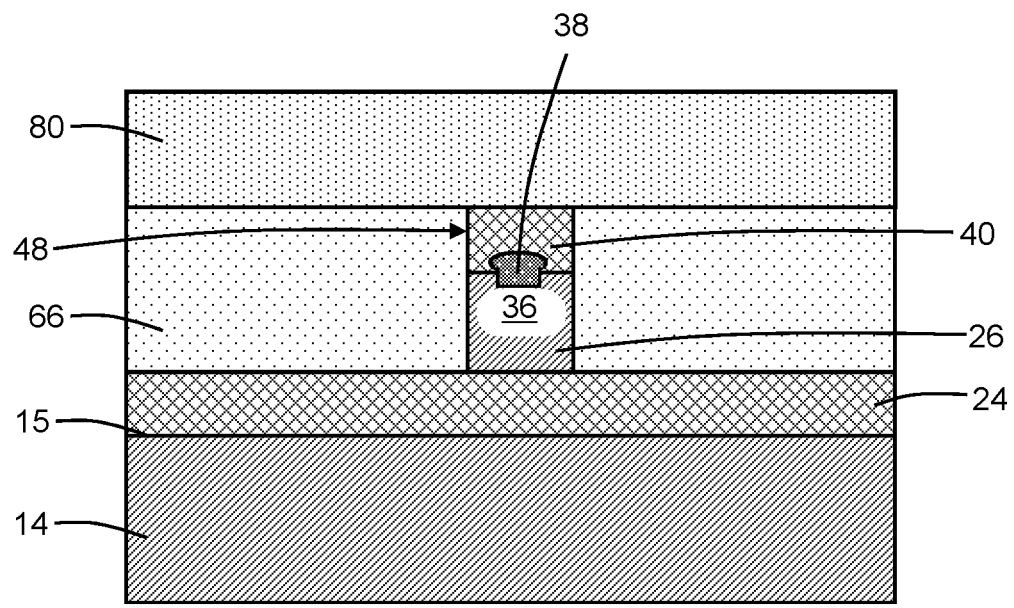
FIGS. 8A-8D are cross-sectional views of the structure at a fabrication stage subsequent to FIGS. 7A-7D.
Figure 8B:
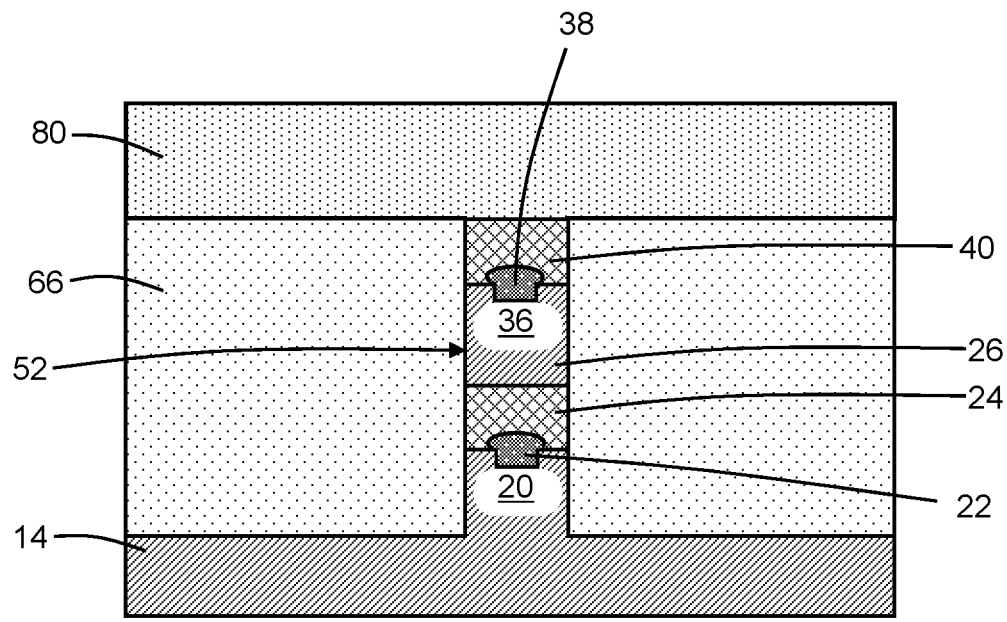
Figure 8C:
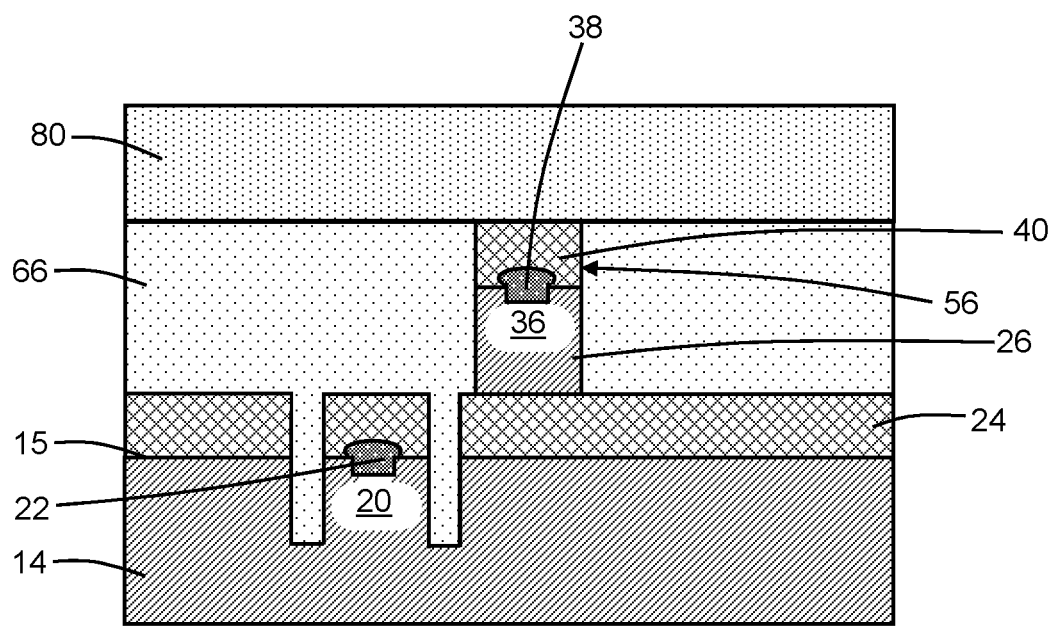
Figure 8D:
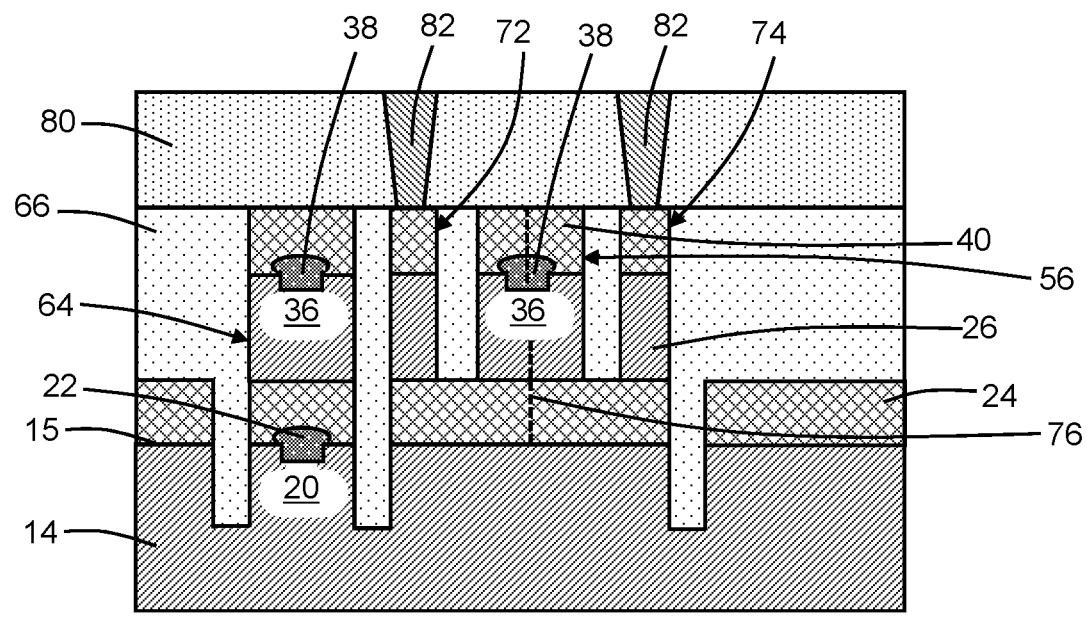
Figure 13:
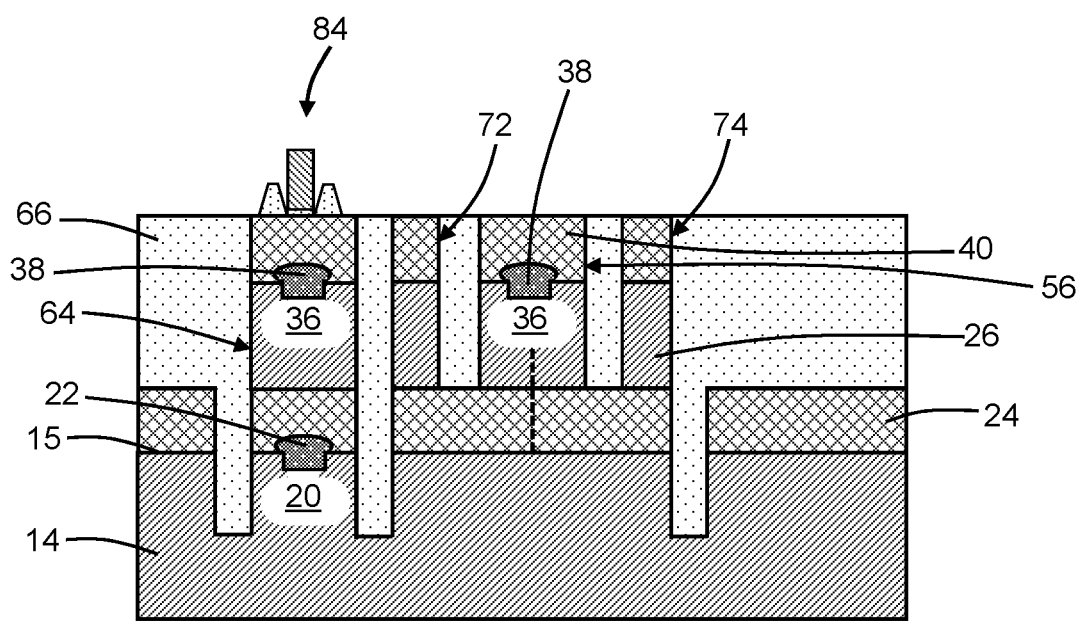
FIG. 13 is a cross-sectional view of a structure in accordance with alternative embodiments of the invention

With reference to FIG. 13 in which like reference numerals refer to like features in FIG. 7D and in accordance with alternative embodiments, a device structure, generally indicated by reference numeral 84, may be formed by front-end-of-line (FEOL) processing using the device region of semiconductor material of the epitaxial layer 40 of the passive waveguide arm 64 of the electro-optic modulator. For example, the device structure 84 may be a field-effect transistor that includes a gate electrode and a gate dielectric formed by depositing a layer stack and patterning the layer stack with photolithography and etching. The gate electrode may be composed of a conductor, such as doped polycrystalline silicon (i.e., polysilicon), and the gate dielectric may be composed of an electrical insulator, such as silicon dioxide. The field-effect transistor providing the device structure 84 in the representative embodiment may include other elements such as source/drain regions, silicide on the source/drain regions, halo regions, lightly doped drain (LDD) extensions, and non-conductive sidewall spacers on the gate electrode.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an electro-optic modulator, the structure comprising:
   a bulk semiconductor substrate including a first plurality of cavities;
   an epitaxial semiconductor layer arranged over the bulk semiconductor substrate, the epitaxial semiconductor layer including a second plurality of cavities;
   a passive waveguide arm including a first core arranged over the first plurality of cavities, the passive waveguide arm including an input port and an output port that is spaced lengthwise from the input port; and
   an active waveguide arm including a second core arranged over the second plurality of cavities, the second core of the active waveguide arm coupled with the input port of the first core of the passive waveguide arm, and the second core of the active waveguide arm coupled with the output port of the first core of the passive waveguide arm.

2. The structure of claim 1 further comprising:
   a third plurality of cavities arranged in the epitaxial semiconductor layer,
   wherein the first core of the passive waveguide arm is arranged in a vertical direction between the first plurality of cavities and the third plurality of cavities.

3. The structure of claim 1 further comprising:
   a first current injection source including a first section of the epitaxial semiconductor layer containing a p-type dopant; and
   a second current injection source including a second section of the epitaxial semiconductor layer containing an n-type dopant.

4. The structure of claim 3 wherein the active waveguide arm includes an electrically-active section laterally arranged between the first current injection source and the second current injection source.

5. The structure of claim 1 further comprising:
   a first waveguide coupler connecting the second core of the active waveguide arm with the input port of the first core of the passive waveguide arm,
   wherein one or more of the second plurality of cavities are arranged as a cladding layer of the first waveguide coupler.

6. The structure of claim 5 further comprising:
   a second waveguide coupler connecting the second core of the active waveguide arm with the output port of the first core of the passive waveguide arm,
   wherein one or more of the second plurality of cavities are arranged in the epitaxial semiconductor layer as a cladding layer of the second waveguide coupler.

7. The structure of claim 6 wherein the passive waveguide arm includes a section that is arranged parallel to the active waveguide arm and offset laterally from the active waveguide arm, the input port extends from the first waveguide coupler to the section, and the output port extends from the section to the second waveguide coupler.

8. The structure of claim 7 wherein the active waveguide arm includes an electrically-active section arranged adjacent to the section of the passive waveguide arm.

9. The structure of claim 1 wherein the first plurality of cavities are arranged in a plurality of rows in the bulk semiconductor substrate, and the first plurality of cavities in at least one of the plurality of rows is filled by a dielectric material.

10. The structure of claim 1 wherein the second plurality of cavities are arranged in a plurality of rows in the epitaxial semiconductor layer, and the second plurality of cavities in at least one of the plurality of rows is filled by a dielectric material.

11. The structure of claim 1 further comprising:
    a field-effect transistor including a gate electrode on a portion of the epitaxial semiconductor layer,
    wherein at least one of the second plurality of cavities is arranged in the portion of the epitaxial semiconductor layer beneath the field-effect transistor.

12. The structure of claim 1 wherein the first plurality of cavities are sealed to define a plurality of airgaps.

13. The structure of claim 1 wherein the second plurality of cavities are sealed to define a plurality of airgaps.

14. The structure of claim 1 further comprising:
    a first dielectric-filled trench extending into the bulk semiconductor substrate; and
    a second dielectric-filled trench extending into the bulk semiconductor substrate,
    wherein the first core of the passive waveguide arm is arranged between the first dielectric-filled trench and the second dielectric-filled trench, and the first dielectric-filled trench and the second dielectric-filled trench each extend to a depth into the bulk semiconductor substrate that is arranged under the first plurality of cavities.

15. A method of forming an electro-optic modulator, the method comprising:
    forming a first plurality of cavities in a bulk semiconductor substrate;

forming a epitaxial semiconductor layer arranged over the bulk semiconductor substrate;

forming a second plurality of cavities in the epitaxial semiconductor layer;

forming a first core of a passive waveguide arm over the first plurality of cavities; and forming a second core of an active waveguide arm over the second plurality of cavities, wherein the passive waveguide arm includes an input port coupling the second core of the active waveguide arm with the first core of the passive waveguide arm, the passive waveguide arm includes an output port coupling the second core of the active waveguide arm with the first core of the passive waveguide arm, and the output port is spaced lengthwise from the input port.

16. The method of claim 15 further comprising:

forming a third plurality of cavities arranged in the epitaxial semiconductor layer, wherein the first core of the passive waveguide arm is arranged in a vertical direction between the first plurality of cavities and the third plurality of cavities.

17. The method of claim 15 further comprising:

forming a first waveguide coupler connecting the second core of the active waveguide arm with the input port of the first core of the passive waveguide arm, wherein one or more of the second plurality of cavities are arranged as a cladding layer of the first waveguide coupler.

18. The method of claim 17 further comprising:

forming a second waveguide coupler connecting the second core of the active waveguide arm with the output port of the first core of the passive waveguide arm, wherein one or more of the second plurality of cavities are included as a cladding layer of the second waveguide coupler.

19. The method of claim 15 further comprising:

forming a first current injection source that includes a p-type dopant in a first section of the epitaxial semiconductor layer; and forming a second current injection source that includes an n-type dopant in a second section of the epitaxial semiconductor layer, wherein the active waveguide arm includes an electrically-active section laterally arranged between the first current injection source and the second current injection source.

20. The method of claim 15 wherein the first plurality of cavities are arranged in a first plurality of rows in the bulk semiconductor substrate and/or the second plurality of cavities are arranged in a second plurality of rows in the epitaxial semiconductor layer.

* * * * *